United States Patent [19]

Linville, Jr. et al.

[11] Patent Number: 5,010,526

[45] Date of Patent: Apr. 23, 1991

[54] METHOD OF DIGITAL FILTERING

[75] Inventors: Andrew F. Linville, Jr., Dallas; Thomas E. Shirley, Richardson, both of Tex.

[73] Assignee: Mobil Oil Corporation, Fairfax, Va.

[21] Appl. No.: 560,409

[22] Filed: Jul. 30, 1990

[51] Int. Cl.$^5$ .......................... G01V 1/28; G01V 1/36
[52] U.S. Cl. ......................................... 367/46; 367/39; 367/43; 364/421; 364/825
[58] Field of Search ....................... 367/39, 43, 46, 49, 367/45; 364/421, 574, 819, 825

[56] References Cited

U.S. PATENT DOCUMENTS 4,104,611 8/1978 Kalden .................................. 367/46
4,853,903 8/1989 Linville, Jr. et al. ................. 367/46

Primary Examiner—Ian J. Lobo
Attorney, Agent, or Firm—Alexander J. McKillop; Charles J. Speciale; George W. Hager, Jr.

[57] ABSTRACT

An improved method for filtering noise bands from seismic data is described. The data is analyzed to determine the frequency component of the undesired noise, and a precise autocorrelation function is generated and used to design a filter to remove the undesired frequency component from the data. The filter can be band pass, band reject, notch, low pass, or high pass, and multiple bands of noise can be removed from the seismic data in a single filtering operation.

10 Claims, 15 Drawing Sheets

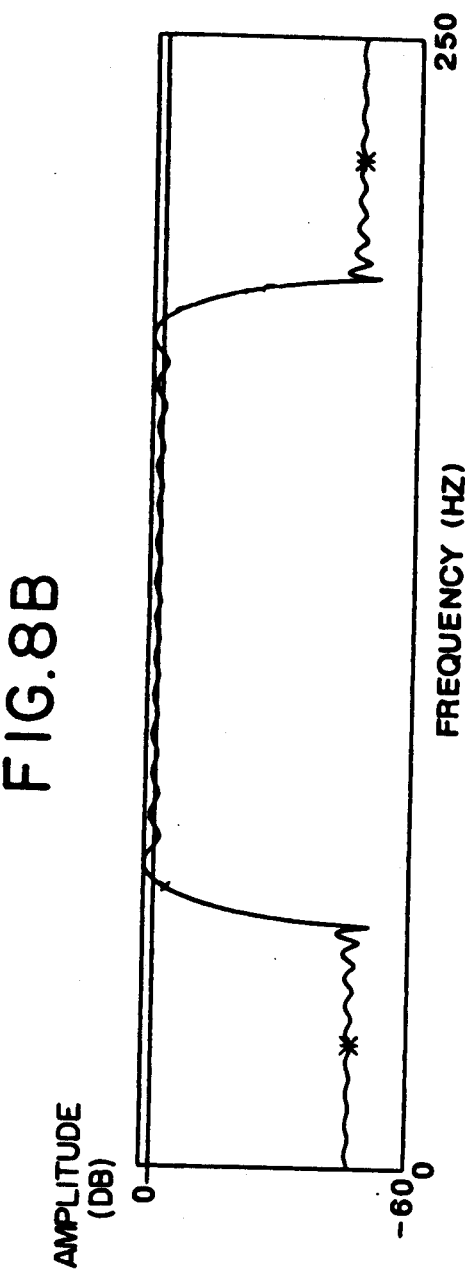
FIG.8A
FIG.8B
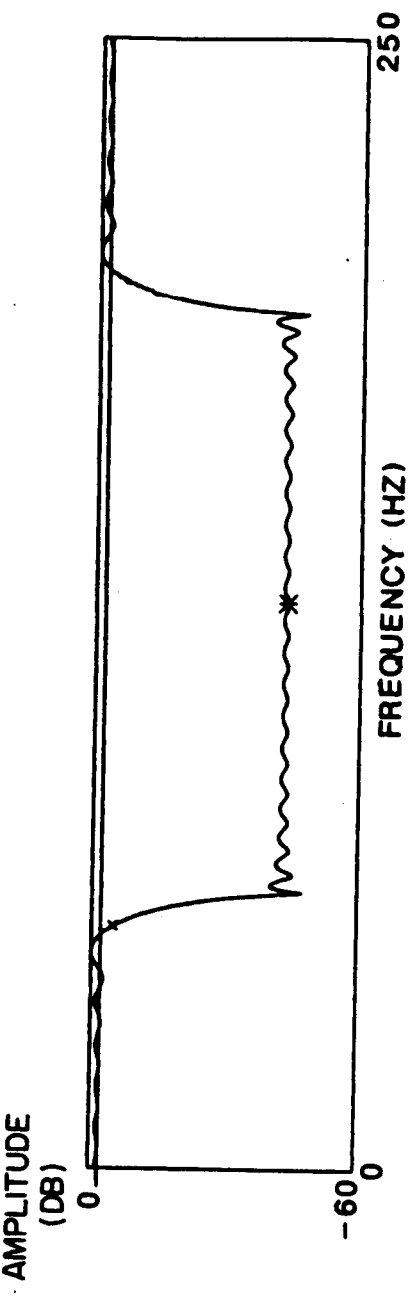
FIG.9A
FIG.9B

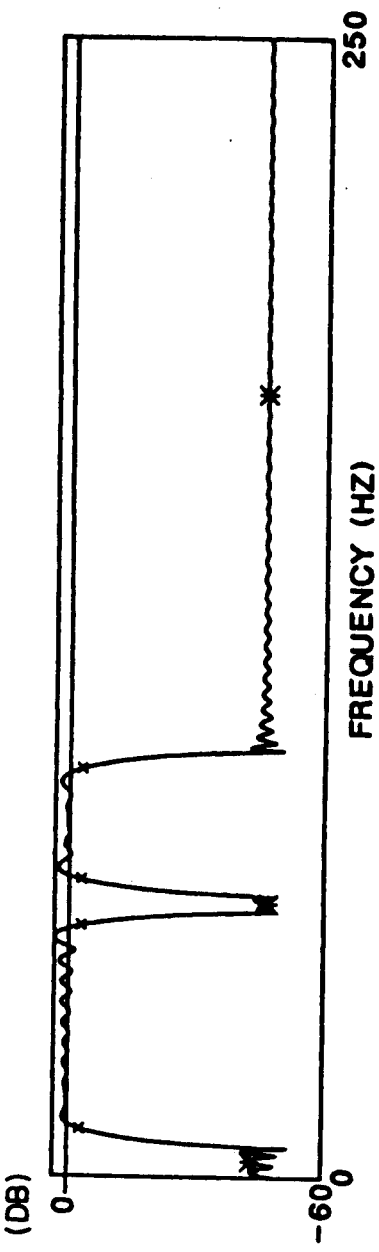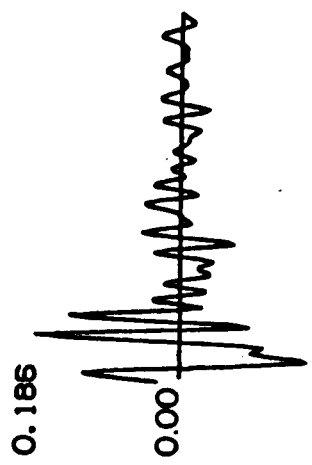

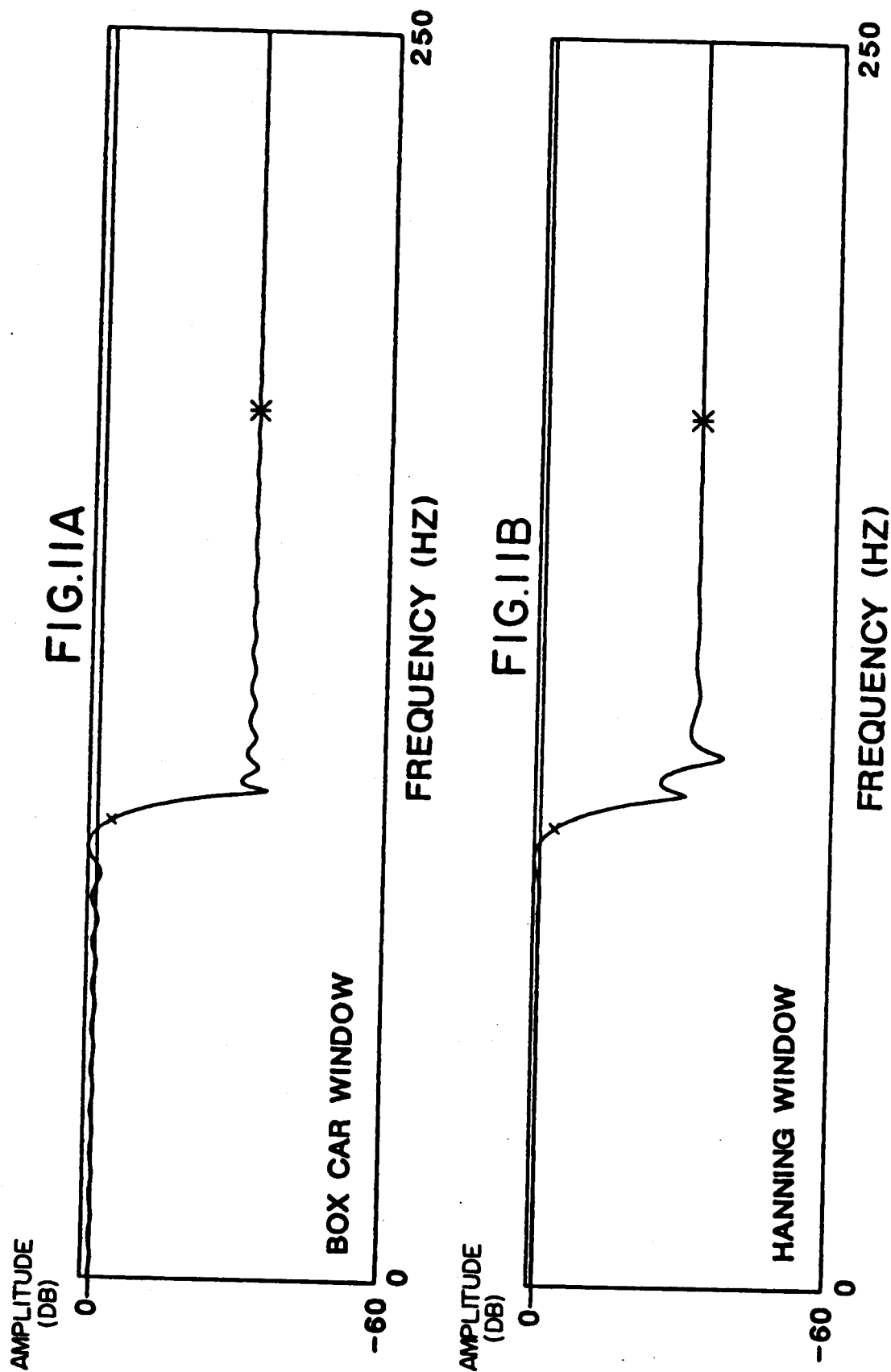

METHOD OF DIGITAL FILTERING

FIELD OF THE INVENTION

This invention relates to an improved method of digital filtering, particularly useful for removing bandlimited noise from seismic data. More particularly, the invention relates to a method of filtering noise from data which can be employed to operate as a band pass, band reject, high pass, low pass, or notch filter.

BACKGROUND OF THE INVENTION

There are many applications in the processing of data in which filtering is required. For example, where data originally recorded at a first sampling rate is to be subsampled at a less frequent rate to save storage space and reduce subsequent processing costs, low pass filtering is commonly performed prior to the resampling step to avoid aliasing in the resultant record. Filtering is also performed to remove sinusoidal noise from the data. For example, if seismic exploration is carried out in the vicinity of a generator or power line, frequently the data will be corrupted by 60 Hz noise and harmonics thereof, which can be a great impediment in reading the data records. There are numerous other sources of noise as well. For example, source generated noise, i.e., waves of seismic energy from the source, often obscures the desired seismic reflection signals. In the marine environment, acoustic noise from a multitude of sources (i.e., the towing ship, the tailbuoy at the end of the "streamer", depth-controlling "birds" on the streamer, etc.) is commonly detected by the hydrophones and recorded. Noise from these sources often occupies well-defined frequency bands and must be removed from the recorded data before interpretation is possible.

This invention relates to improved methods of removing such band-limited noise from data.

More particularly, in seismic exploration of the earth for oil, gas and other valuable minerals, the usual practice is to impart energy into the earth at a "shot point". This can be done on land by detonating a charge of dynamite, or shaking a heavy weight and coupling the energy into the earth. In water-based exploration, this is done by releasing a "shot" of compressed air into the water. In each case, the energy travels downwardly into the earth, is reflected at interfaces between rock layers, and returns upwardly, where it can be detected by geophones (on land) or by hydrophones (in the water). Output signals from the detectors, or "traces", are recorded as functions of time, and the shapes of the "wiggles" in them analyzed to determine the shape of the reflectors within the earth. The shapes of the reflectors are then analyzed by geophysicists in their search for valuable minerals.

The fact that the seismic energy must travel deeply into the earth and return necessarily means that the signals which are to be detected are quite weak and can readily be obscured by noise. Accordingly, a great deal of attention has been paid to the removal of noise from seismic records. However, further improvements are still needed. Even where a particular method may yield useful results, it is of substantial utility to reduce the time necessary to process the data accordingly, as such processing steps can be very expensive. It is also of substantial utility to minimize the computational effort required to design suitable filters.

It will be appreciated by those of skill in the art that certain types of random noise often found in seismic records can be removed from seismic records by "stacking", that is, by summing together comparable traces in which the noise is essentially random. Because the noise is random while the signals are correlated, the signal-to-noise ratio can be improved by the stacking process. However, if the noise occupies an identifiable frequency band which differs from the frequency of the seismic energy, a much greater improvement is obtained by first filtering the data traces to remove the noise.

As indicated above, a common source of noise corrupting seismic records is noise from known sources. While the art teaches methods of removing such noise from records, the methods proposed in the prior art have normally involved digital filtering using relatively long operators to remove the noise from the data records. Such techniques are quite expensive, as the operators involve numerous coefficients which must be multiplied by the individual digital samples of the traces. Thus, the cost of such operations goes up with the number of coefficients. In many cases, the cost is so high that the noise is simply ignored and the geophysicist is obliged to read the data despite the presence in the record of noise of known frequency content, which could be removed if an adequate method were provided for doing so.

The art also teaches the use of notch filters for removal of sinusoidal noise from signals. However, the art has typically not implemented these in a way which is truly useful.

In U.S. Pat. No. 4,853,903 issued to the present inventors and a third inventor on Aug. 1, 1989, (hereinafter "the '903 patent") there is disclosed a method for removing one or more sinusoidal noise components from a seismic record. This patent is not prior art to the instant application, but is incorporated herein by reference. In the '903 patent, an individual trace of a set of data traces is analyzed to determine the frequency of the interfering sinusoidal noise by Fourier transformation thereof. A digital notch filter is constructed using the exact autocorrelation function of the sinusoidal noise. The notch filter is then convolved with the data trace thus removing the sinusoidal noise from the signal.

The present invention comprises a further improvement and refinement of the techniques shown in the '903 patent.

SUMMARY OF THE INVENTION

The method of the present invention allows removal of bands of energy from a data trace. As in the process described in the '903 patent, one or more of the traces is typically first Fourier-transformed to determine the frequency components of the noise to be removed. Summed analytic autocorrelations describing the noise to be removed are used in a mathematical formula to determine the exact filter operator required to remove noise energy in one or more frequency bands from the data. The filter operator is then convolved with the data, removing the noise from the data traces.

The filter obtained by the above process is minimum phase. If a zero-phase filter is required, e.g., for processing of seismic records generated by vibrating massive objects in the well understood "Vibroseis" process, the minimum phase filter can then be autocorrelated, producing a symmetric zero-phase filter. A "window" may also be applied to the data, to reduce ripple in the pass band.

BRIEF DESCRIPTION OF THE DRAWINGS

The invention will be better understood if reference is made to the accompanying drawings, in which:

FIGS. 8(a) and 8(b) show corresponding figures for a band pass filter;

FIGS. 9(a) and 9(b) show comparable figures for a band reject filter;

FIGS. 10(a) and 10(b) show comparable figures for a multiple band pass filter;

FIGS. 11(a) and 11(b) compare the standard "box car" window technique with an optional "Hanning window" technique used to reduce pass band ripple in the frequency response.

DESCRIPTION OF THE PREFERRED EMBODIMENTS

Figure 1:
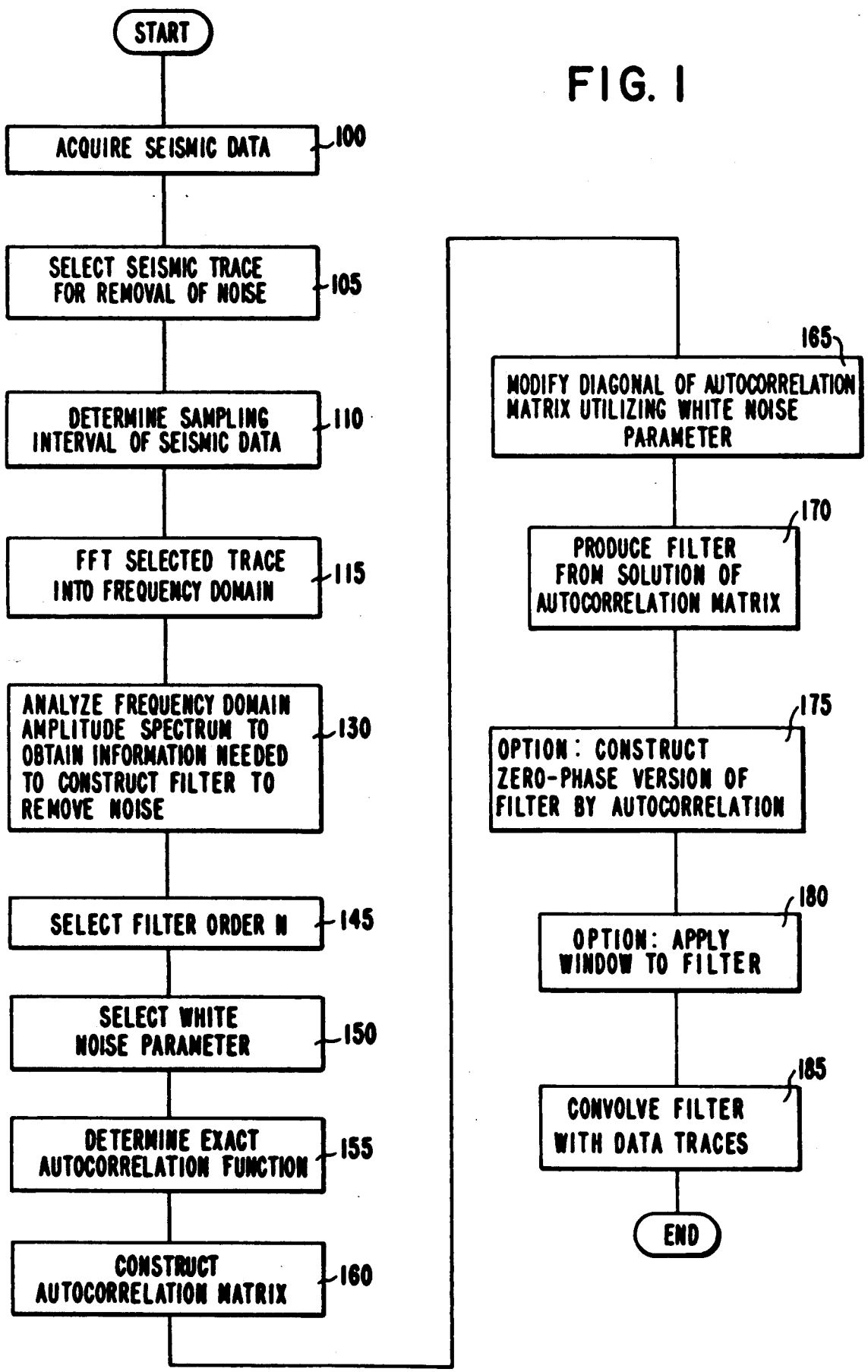
FIG. 1 shows generally a flow chart of the steps taken in the processing of seismic data according to the invention.
Figure 2A:
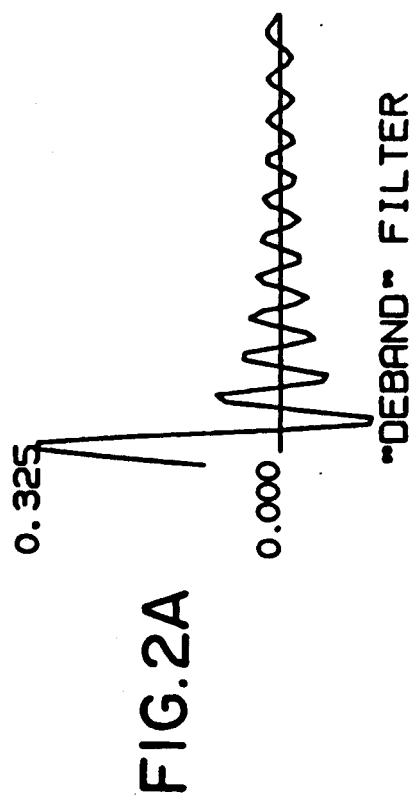
FIGS. 2(a) through 2(d) show respectively the coefficients of a minimum phase "deband" ("deband" being an acronym for deconvolution of a spectral band) filter according to the invention, the filter's relative amplitude spectrum expressed as a function of frequency, the filter spectrum expressed in db, again as a function of frequency, and the filter phase spectrum, also as a function of frequency.
Figure 2B:
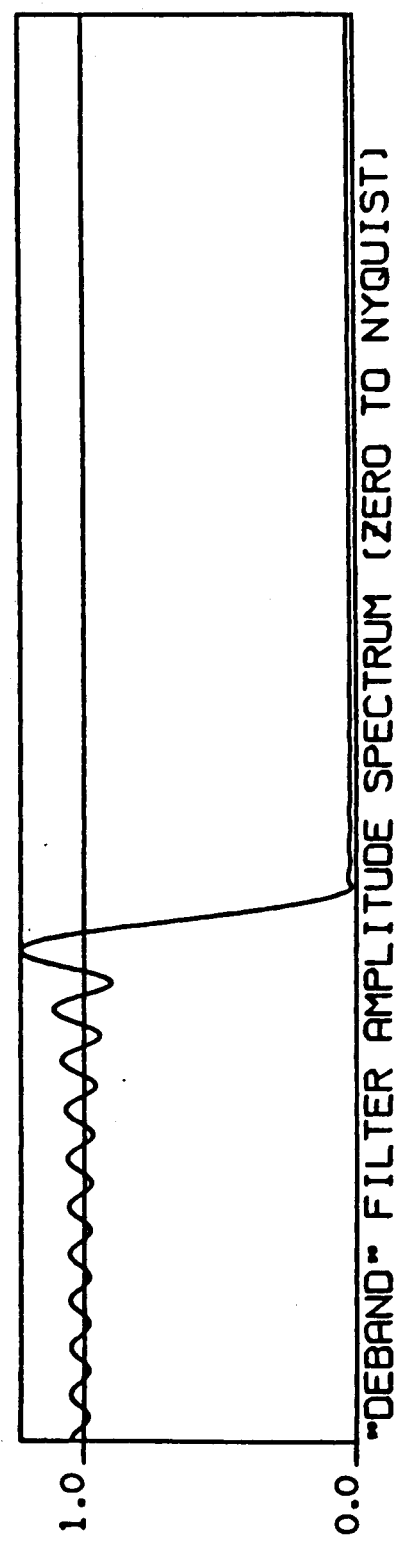
Figure 2C:
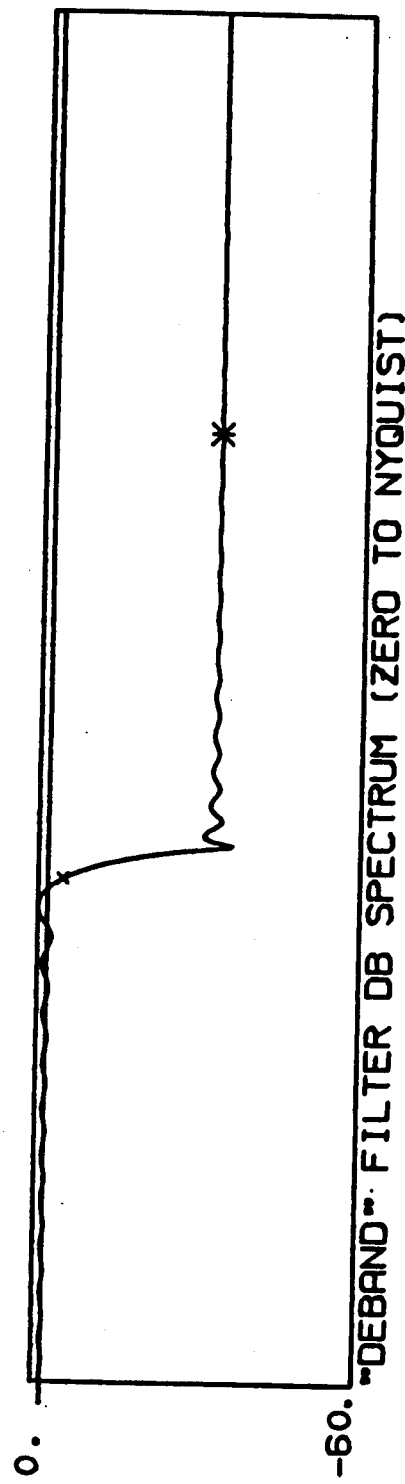
Figure 2D:
Figure 3A:
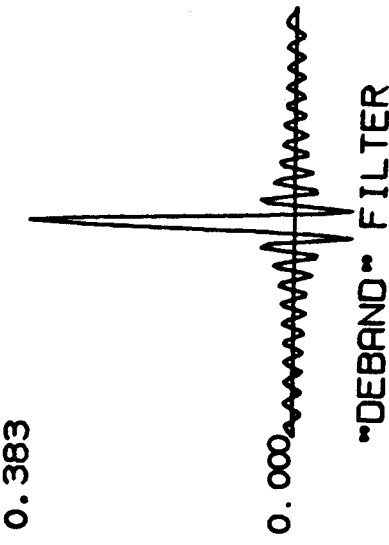
FIGS. 3(a) through 3(d) show corresponding displays for a zero phase "deband" filter.
Figure 3B:
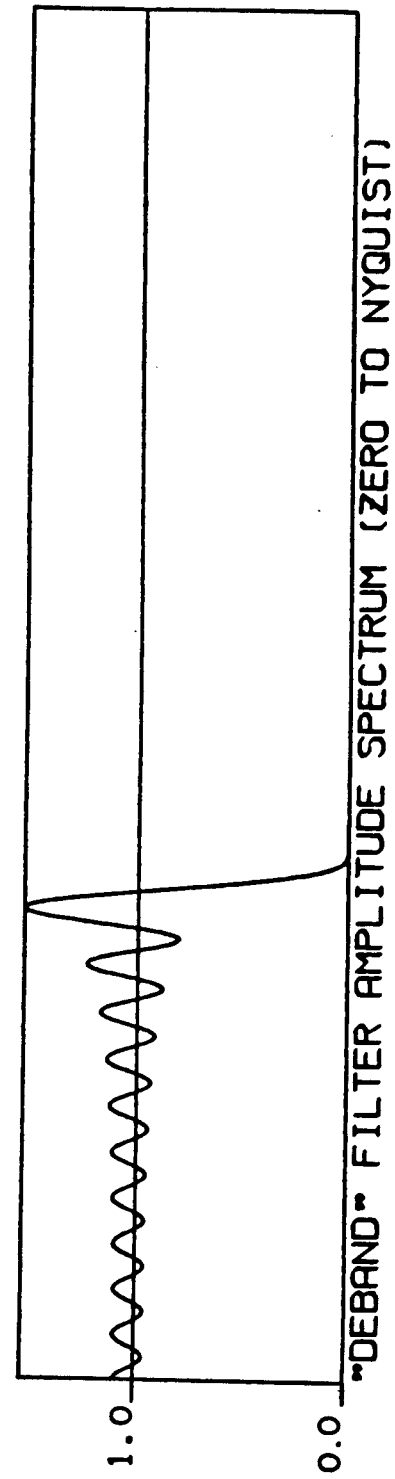
Figure 3C:
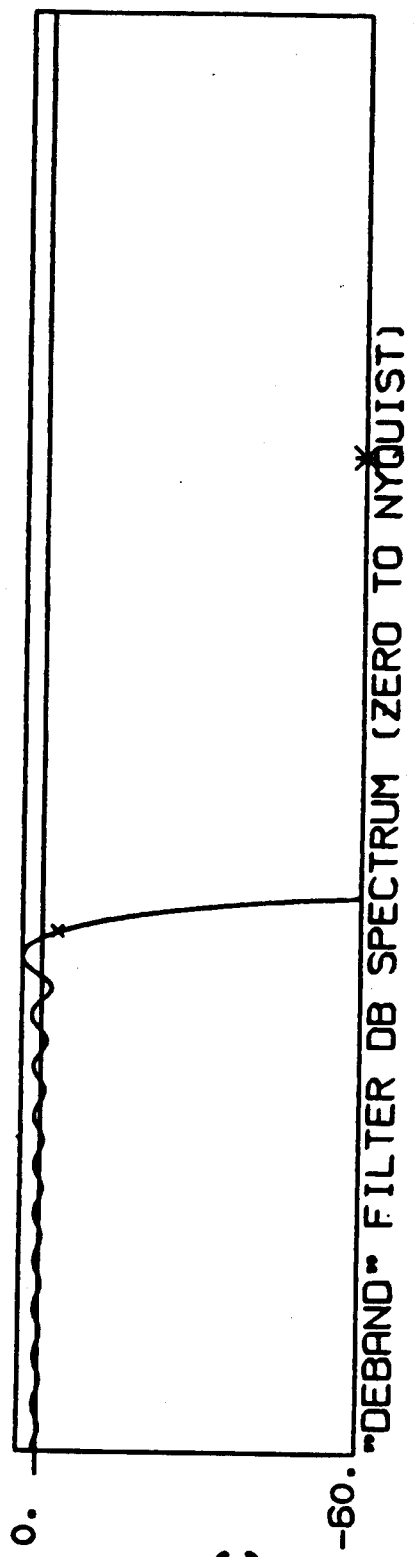
Figure 3D:
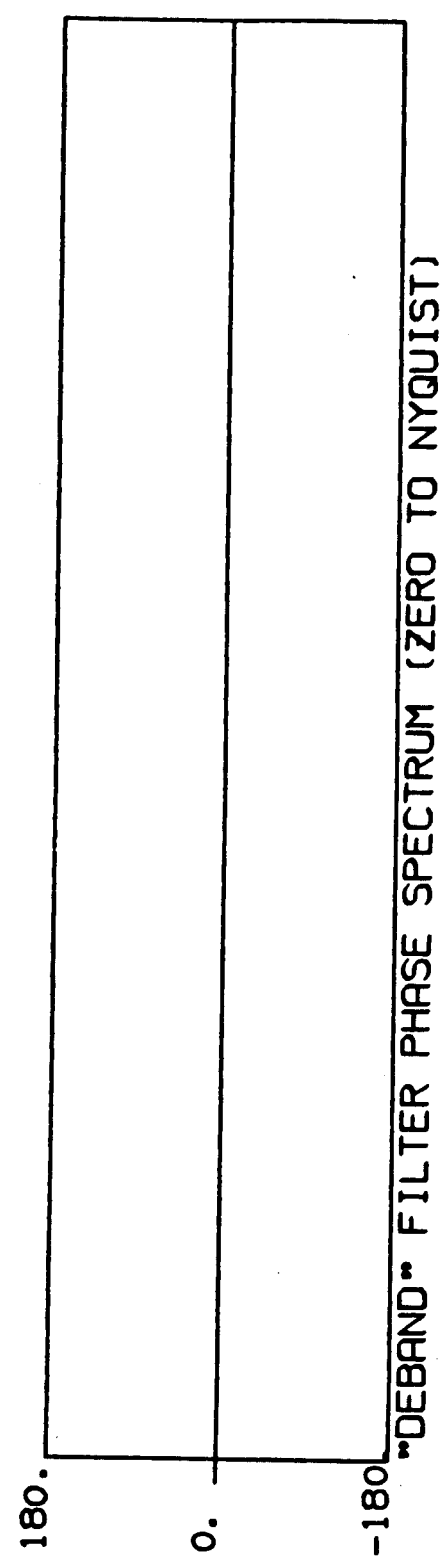

The present invention thus relates to analysis of data records to determine frequency components of noise to be removed according to the invention, and to design of an optimal filter to be convolved with the data to remove the undesired noise. The steps taken in the process of the invention, which are shown in FIG. 1, are generally comparable to those taken in the '903 patent referred to above. In step 100, seismic data is acquired using conventional processes. Typically, energy is imparted to the earth at a first location, termed the "shot point", and is detected at a number of detector locations after reflection from interfaces within the earth. The signals recorded by the detectors are recorded as functions of time.

Figure 12A:
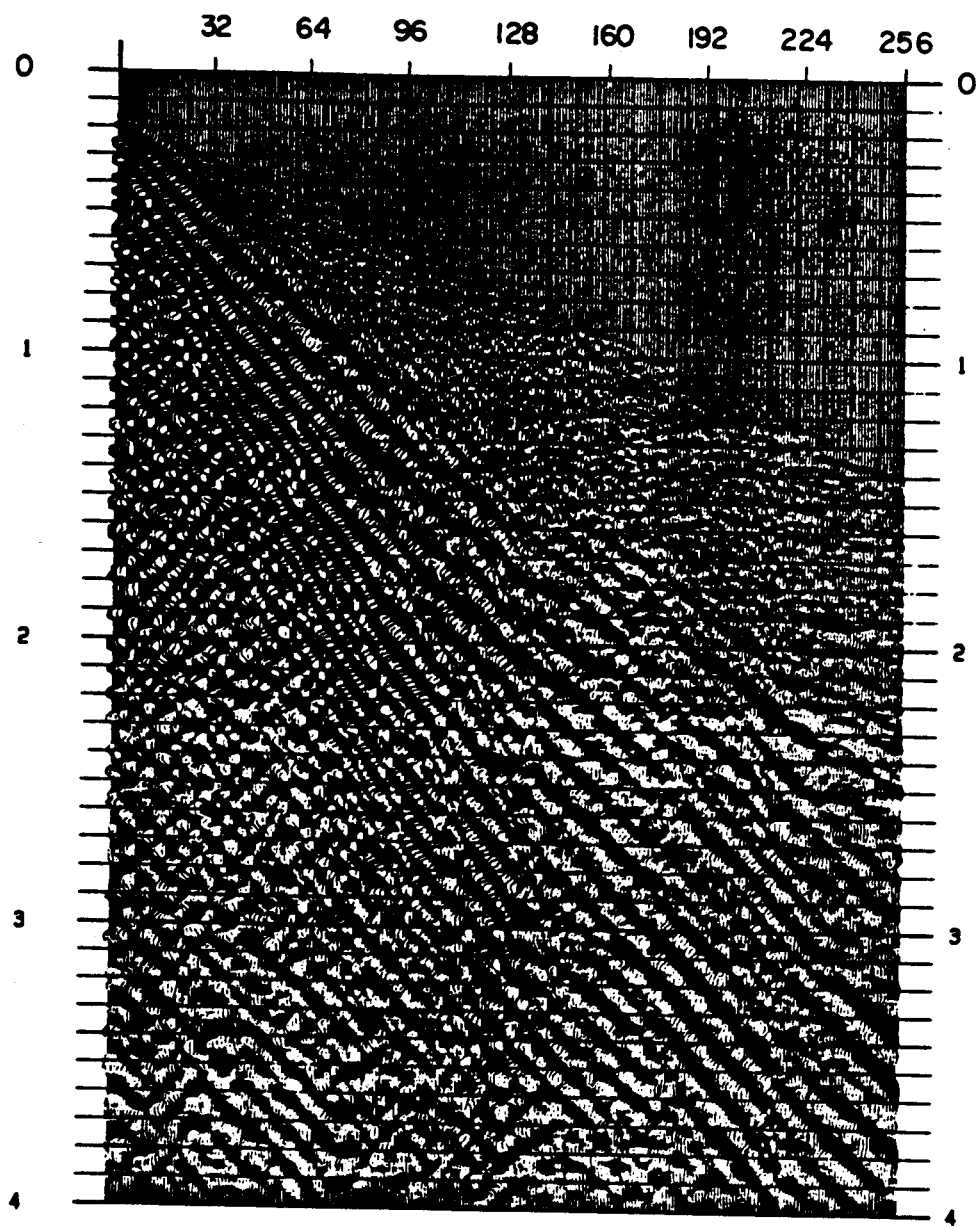
FIGS. 12(a) and 12(b) provide examples of the use of the filtering technique of the invention on real data.

Commonly, the traces output by each of the detectors are graphed next to one another in order of the "offset" between the source and detector locations. FIG. 12(a) shows an example of such data. In this Figure, the vertical axis represents time (in seconds), the horizontal axis is the amplitude of the signal, and the signals from some 256 detectors are graphed next to one another in order of increasing offset.

Returning to the discussion of FIG. 1, in step 105, one or more seismic traces are selected for removal of sinusoidal or other generally regular noise. At step 110, the sampling interval of the seismic data is determined; typically the sampling interval is 0.002 seconds for data having a Nyquist frequency of 250 Hz. At step 115, the selected trace is Fourier transformed, typically using the well known fast Fourier transform (FFT) algorithm, into the frequency domain. This permits performance of step 130, in which the frequency domain amplitude spectrum is analyzed to determine the frequency content of any sinusoidal or other regular noise. That is, in step 130, the frequencies to be filtered according to the invention are determined. In step 145, the filter order n is selected; n is the number of coefficients of the filter to be determined, and is proportional both to the transition band width of the filter and also the amount of computational time required to employ it. Therefore, in this step, a trade-off is made between the transition band width of the filter and the cost of the processing operation. The transition zone is the region of the filter's response between the pass band and the stop band.

In step 150, a "white noise" parameter is selected; white noise is added to the zero-lag or diagonal autocorrelation values prior to filter design. The white noise level controls the amount of rejection in the filter stop band.

In step 155, the exact autocorrelation function $R_x(\tau)$ is determined for a filter of order n, where n is the number of filter coefficients. This is done according to the following formula:

$$R_x(\tau) = B\left[\frac{\sin\pi B\tau}{\pi B\tau}\right]\cos(2\pi f_0 \tau)$$

wherein:

$R_x(\tau)$ is the exact autocorrelation function of the noise;

B is the bandwidth of the noise to be removed;

$f_0$ is the center frequency of the band of noise to be removed; and $\tau$ is 0, 1, ... n−1, that is the "lag" of each autocorrelation value $R_x(\tau)$, so that $\tau$ represents the relative position of each autocorrelation value $R_x(\tau)$ in the sequence thereof.

The autocorrelation values $R_x(\tau)$ are then used in step 160 to construct a Wiener-Levinson autocorrelation matrix used conventionally in the art for predictive deconvolution. This step and the subsequent steps 165 and 170 are as described in the '903 patent. In step 165, the autocorrelation matrix is modified using the white noise parameter selected above at step 150. In step 170, the normal equations are solved as discussed in connection with equation 8 of the '903 patent, yielding a convolutional filter $h_k$ consisting of a number of coefficients $h_0, h_1, \ldots h_{n-1}$, which are convolved with the data traces in step 185 to apply the filter.

It will be appreciated by those of skill in the art that the process described herein (and in the '903 patent) can be termed a method of generating a least-squares finite impulse response filter. Again, reference is made to the '903 patent for further details of the filter generation step. These mathematical processes are fully described as well in Levinson, "The Wiener rms (root mean square) Error Criteria in Filter Design and Prediction", *J. Math and Physics*, vol. 25, pages 261–278, which is reprinted in Wiener, *Extrapolation, Interpolation and Smoothing of Stationary Time Series with Engineering Applications*, MIT Press (1949).

Optionally, in step 175, a zero phase version of the filter can be produced. As computed above, the filter will automatically be minimum phase, e.g., this filter will delay the phase energy the least possible amount. As noted, by autocorrelating the filter thus produced a zero phase filter can be provided.

The basic filter design window is a box car function which produces ripple in the passband. The ripple is always less than 3 db. According to a second option, a window can be applied to the filter in step 180 to reduce ripple in the passband. Such windows are described in Blackman and Tukey, *Measurement of Power Spectra* (1958), at pages 98-99. The Hanning and/or Hamming windows described therein are satisfactory for the purpose. FIGS. 11(a) and 11(b) provide examples of the use of windows of this type.

FIGS. 2(a-d) show curves characteristic of a first minimum-phase low pass filter operator according to the invention. FIG. 2(a) shows the relative amplitude of the coefficients $h_0, h_1, \ldots h_{n-1}$, of the filter. This particular filter operator consisted of 65 points taken at 0.002 second intervals yielding an overall operator length of 0.128 seconds. The center frequency $f_0$ was 172.885 Hz and the width B of the reject band was 154.231 Hz. FIG. 2(b) shows the relative filter amplitude spectrum on a scale ranging from 0 to 1, from 0 Hz at the left edge of the figure to the Nyquist frequency at the right. FIG. 2(c) shows a similar figure with the amplitude expressed in db; the rejection is approximately $-32$ db and the filter response is 3 db down at 90.73 Hz. FIG. 2(d) shows the filter phase spectrum in degrees. The maximum phase shift of $-338$ degrees is exhibited at approximately 93 Hz. As indicated, this filter comprises a minimum phase operator, and the box car window technique, well understood in the art, has been applied.

FIGS. 3(1-d) show similar spectra for a zero phase operator, i.e., the filter of FIGS. 2(a-d) having been autocorrelated with itself as described above. Thus, the filter is symmetric as shown in FIG. 3(a). The filter amplitude spectrum is similar to that of the minimum phase filter of FIGS. 2(a-d), while the rejection of $-64$ db is approximately double. However, the phase spectrum of FIG. 3(d) indicates that there is zero phase shift, as mentioned previously.

Figure 4A:
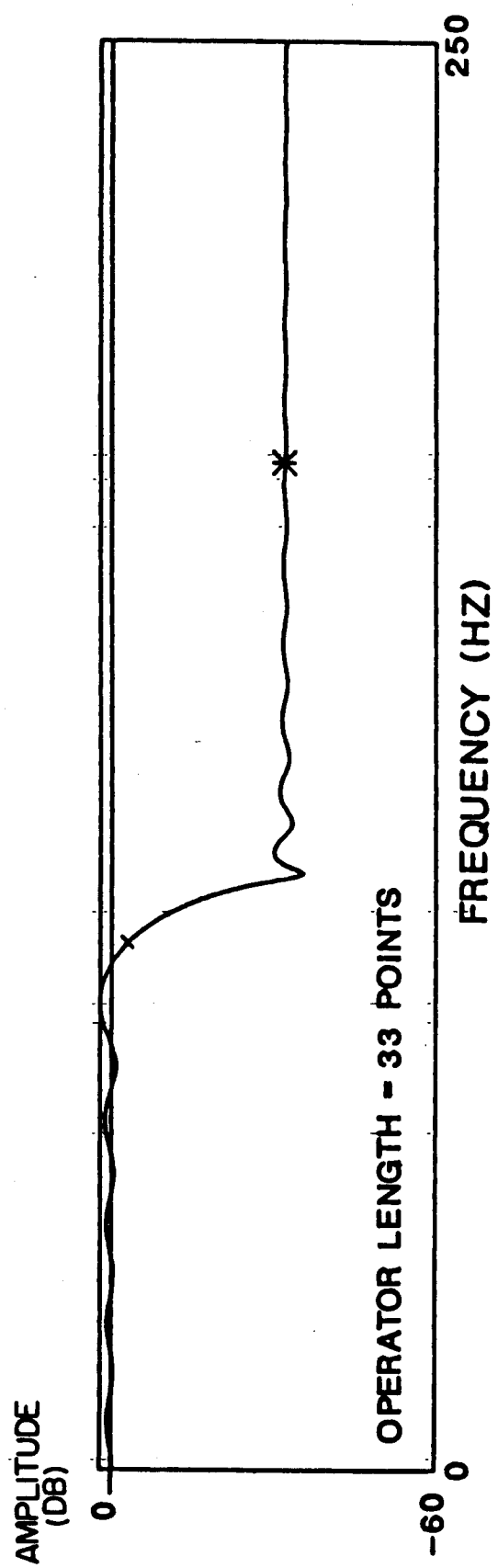
FIGS. 4(a) and 4(b) show the frequency response of two filters including differing numbers of points in the operator to illustrate the effect of this variation.
Figure 4B:
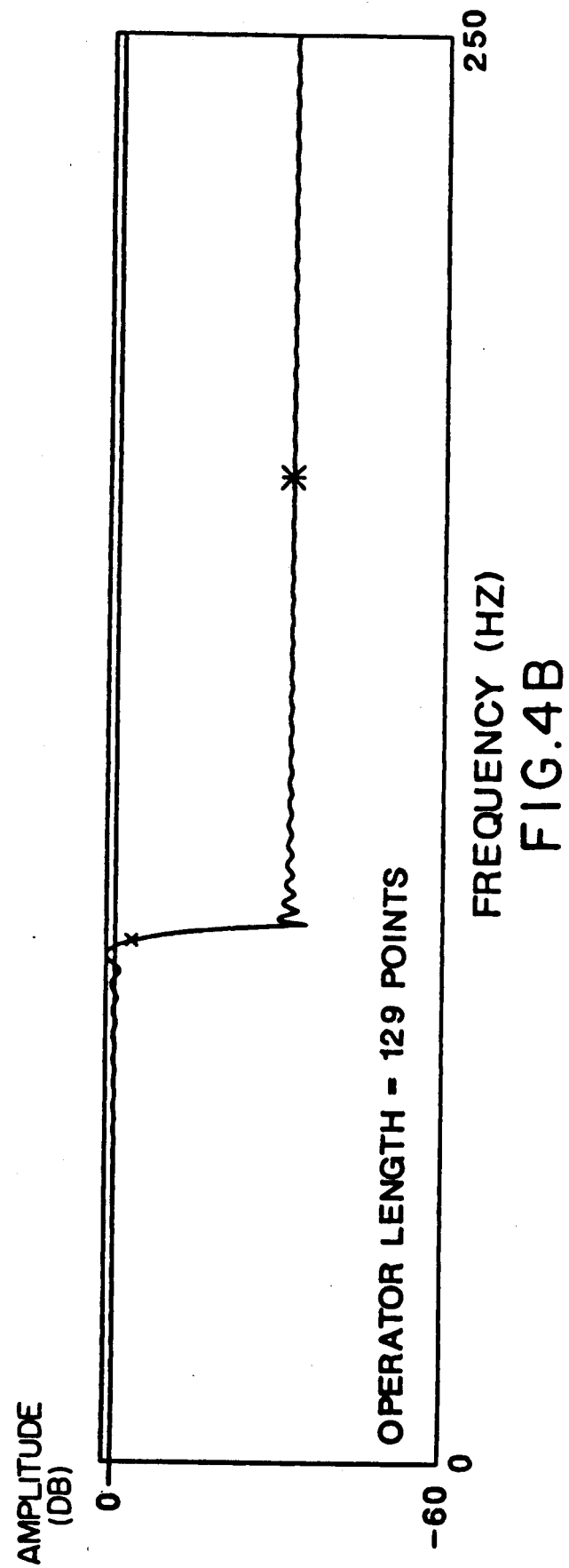

FIGS. 4(a) and 4(b) show amplitude as a function of frequency for otherwise identical minimum-phase filters having 33 and 129 coefficients in the operator. As can be seen, the filter of FIG. 4(b), having 129 points in the operator, has a sharper cutoff than that of FIG. 4(a), comprising only 33 points, showing that the number of points in the operator controls the transition band width. Of course, use of the longer operator will increase the computation time.

Figure 5A:
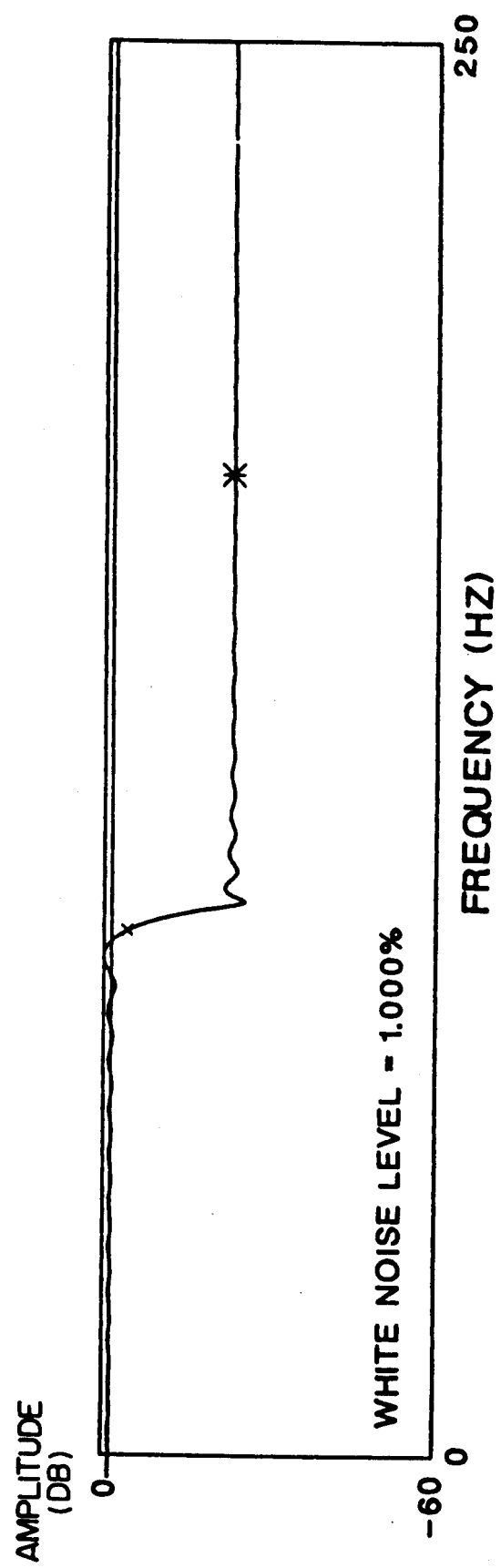
FIG. 5(a) and 5(b) show the frequency response of two filters prepared using two different values for white noise added to the autocorrelation matrix, to illustrate the effect of this variation.
Figure 5B:
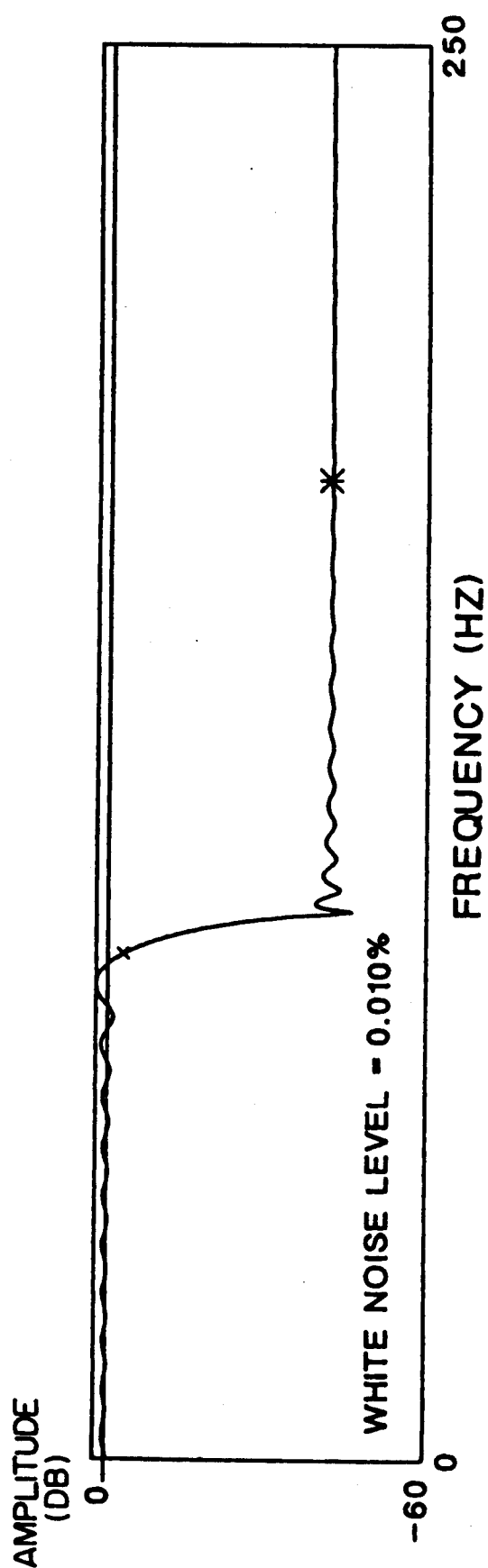

FIGS. 5(a) and 5(b) compare the filter results given variation of the white noise level, between 1.0% in FIG. 5(a) and 0.01% in FIG. 5(b). In the latter case, the rejection is $-41.8$ db, in the former it is $-22$ db. Thus, the white noise level controls the amount of rejection. In this example, each time the white noise level is reduced by a factor of 10, an additional 10 db of rejection is achieved.

Figures 6A, 6B, 7A, 7B:
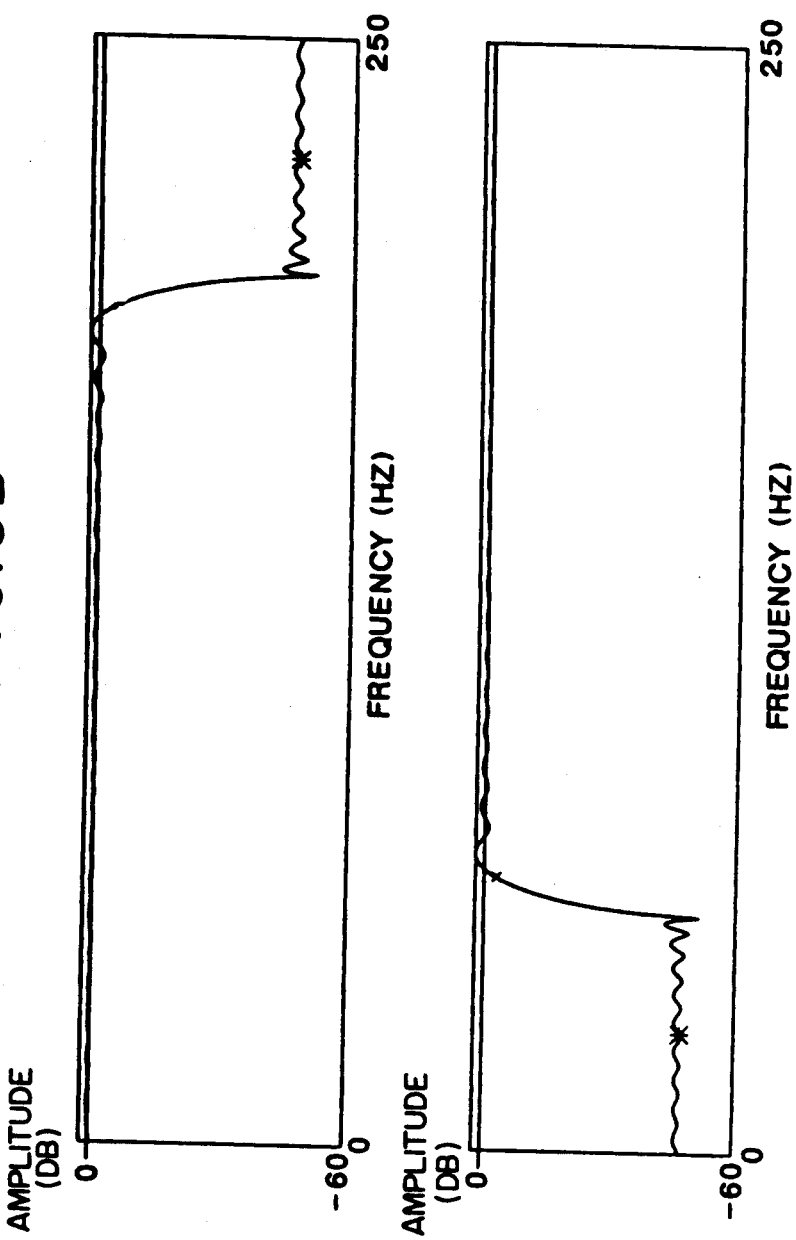
FIGS. 6(a) and 6(b) show respectively the operator for a low pass filter and its frequency spectrum.
FIGS. 7(a) and 7(b) show comparable figures for a high pass filter.

FIGS. 6(a) and 6(b), 7(a) and 7(b), 8(a) and 8(b), and 9(a) and 9(b) all show minimum-phase operators and display of amplitude with respect to frequency, respectively, for different types of filters. FIG. 6(a) shows an operator and FIG. 6(b) the frequency response of a low pass filter; FIGS. 7(a) and 7(b) show similar displays for a high pass filter; FIGS. 8(a) and 8(b) show similar displays for a band pass filter; and FIGS. 9(a) and 9(b) show similar results for a band reject filter.

According to another aspect of the invention, the operators can be designed to remove or pass several different frequencies as desired. FIGS. 10(a) and 10(b) show respectively the minimum phase operator and the frequency response of such a multi-band filter. The example was calculated employing a 2 millisecond sample interval, a filter length of 128 points, and a white noise level of 0.01%. The example shown will reject noise below 10 Hz, while passing signal between 10 and 90 Hz, which would allow the data to be resampled from 2 milliseconds to 4 milliseconds without aliasing. Noise in a 55-65 Hz band is also rejected, thus eliminating power line frequencies from the data.

By attenuating several noise components with a single operator without increasing the length of the filter, according to this aspect of the invention, the cost of data processing is reduced. To accomplish this, analytic autocorrelation functions calculated as above for each reject band are summed prior to filter design, resulting in a single multiple band filter. The noise rejection level in each reject band can be separately chosen by relative scaling of each analytic autocorrelation function prior to summing.

FIGS. 11(a) and 11(b) compare the normal "box car" filter design with a filter in which a Hanning window, as described in the Blackman and Tukey text referred to above, is employed. The vertical sides of the normal box car filter, together with finite filter length, lead to pass band ripple as shown. The ripple can be reduced by using the Hanning window design or one or more alternative windows discussed in the text cited. As shown in FIG. 11(b), windowing the filtering coefficients reduces ripple but increases the width of the transition between the stop band and the pass band. However, the noise rejection is not compromised by windowing.

Figure 12B:
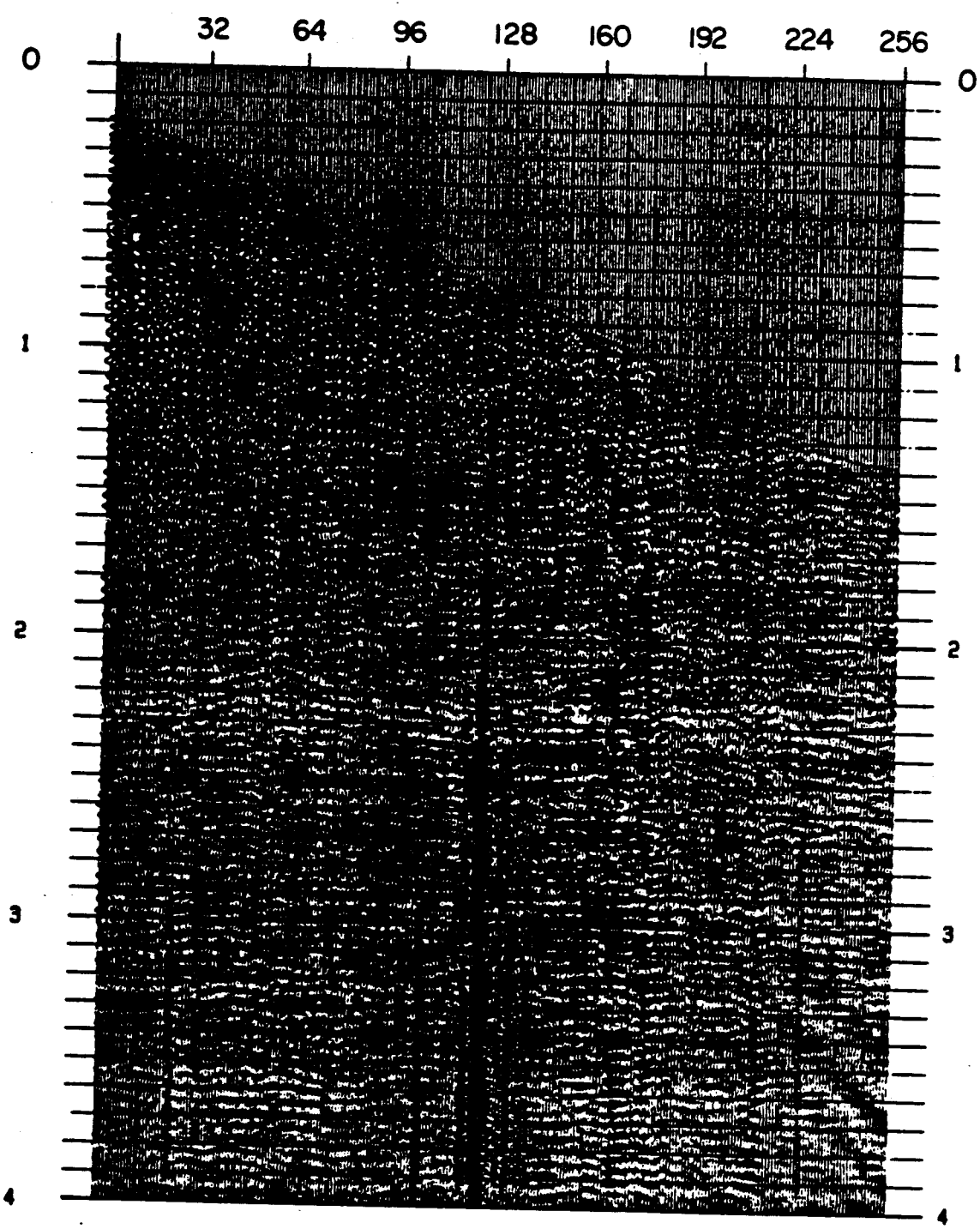

FIGS. 12(a) and 12(b) show raw data and data processed according to the method of the invention, respectively. The format of the data displayed was discussed above; essentially, the vertical axis is time, measured in seconds from the time of imparting energy to the earth, while the horizontal axis represents offset between the source and the receiver. The horizontal deflection of each trace represents the amplitude of the signal at the corresponding time. In FIG. 12(a), the raw data is shown. FIG. 12 (b) shows the output record having been processed using the method of the invention, using a band reject filter attenuating energy of frequencies between 6 and 18 Hz to remove surface wave noise, as is typically generated when dynamite is used as the source of seismic energy. As can be seen, very substantial noise appearing in the record of FIG. 12(a) has been removed from the record of FIG. 12(b), leaving nearly horizontally aligned deflections in many of the traces, indicating the presence of reflectors in the subterranean structure. These traces can then be processed according to methods known in the art to yield seismograms more directly useful to geologists in the search for oil, gas and other minerals.

The filters specified herein have been described as defined by the stop band frequencies. It is common practice in the seismic processing art to specify the desired pass band instead. In a preferred embodiment of the invention, it is implemented such that the user can supply desired pass band frequency parameters. An algorithm computes the corresponding stop band frequencies needed for the filter design from the input pass band parameters supplied by the user. The stop band is adjusted to account for transition band width according to the following equation:

$$ADJ = 0.75/FLS$$

wherein ADJ is the frequency adjustment required in Hz, and FLS is the filter length in seconds. This adjustment formula has been found to provide reasonable results for typical filter design parameters.

While a preferred embodiment of the invention has been described in detail, it will be recognized by those of skill in the art that further modifications and improvements can be made thereto without departing from the spirit and scope of the invention. Therefore, the invention is not to be limited by the above disclosure, but only by the following claims.

We claim:

1. A method of filtering data records, comprising the steps of:

determining the frequency of energy to be filtered from the records;

choosing the bandwidth of the filter to be applied;

selecting a filter order n;

computing the exact autocorrelation function $R_x(\tau)$ for one or more bands of energy to be filtered according to the following equation:

$$R_x(\tau) = B\left[\frac{\sin \pi B\tau}{\pi B\tau}\right]\cos(2\pi f_0 \tau)$$

wherein $R_x(\tau)$ is the exact autocorrelation function of the noise;

B is the bandwidth of the noise to be removed;

$f_0$ is the center frequency of the band of noise to be removed; and $\tau$ is 0, 1, ... n−1;

using the autocorrelation function thus determined to generate a series of filter coefficients $h_0, h_1, \ldots h_{n-1}$; and applying said filter coefficients $h_0, h_1, \ldots h_{n-1}$ to the data to filter out the undesired frequency components.

2. The method of claim 1 wherein said filter coefficients are calculated by inserting the values of the autocorrelation function $R_x(\tau)$ into a predictive Wiener-Levinson autocorrelation matrix.

3. The method of claim 2, wherein white noise is added to the diagonal of the matrix prior to calculation of the filter coefficients $h_0, h_1, \ldots h_{n-1}$.

4. The method of claim 1, comprising the further step of autocorrelating the filter coefficients $h_0, h_1, \ldots h_{n-1}$ to generate a zero-phase filter.

5. The method of claim 1 wherein said step of determining the frequency of energy to be removed is performed by taking the Fourier transform of the input signal and determining undesired frequencies.

6. A method of removing noise components from seismic data recorded in seismic exploration wherein seismic energy sources are activated at spaced locations along a line of exploration, and signals responsive to reflection of the seismic energy within the earth are recorded as a function of time at spaced locations along the line of exploration to produce a series of seismic traces, said seismic traces comprising seismic data components and noise components, said method comprising the steps of:

determining the frequency of energy to be filtered from the records;

choosing the bandwidth of the filter to be applied;

selecting a filter order n;

computing the exact autocorrelation function for one or more bands of energy to be filtered according to the following equation:

$$R_x(\tau) = B\left[\frac{\sin \pi B\tau}{\pi B\tau}\right]\cos(2\pi f_0 \tau)$$

wherein:

$R_x(\tau)$ is the exact autocorrelation function of the noise;

B is the bandwidth of the noise to be removed;

$f_0$ is the center frequency of the band of noise to be removed; and $\tau$ is 0, 1, ... n−1;

using the autocorrelation function $R_x(\tau)$ thus determined to generate a series of filter coefficients $h_0, h_1, \ldots h_{n-1}$; and applying said filter coefficients $h_0, h_1, \ldots h_{n-1}$ to the data to filter out the undesired frequency components.

7. The method of claim 6 wherein said coefficients are calculated by inserting the values of the autocorrelation function $R_x(\tau)$ into a predictive Wiener-Levinson autocorrelation matrix.

8. The method of claim 7, wherein white noise is added to the matrix diagonal prior to calculation of the coefficients $h_0, h_1, \ldots h_{n-1}$.

9. The method of claim 6, comprising the further step of autocorrelating the filter coefficients $h_0, h_1, \ldots h_{n-1}$ to generate a zero phase filter.

10. The method of claim 6 wherein said step of determining the frequency of the energy to be removed is performed by taking the Fourier transform of the input signal and determining the undesired frequencies.

* * * * *